United States Patent [19]

Richardson et al.

[11] Patent Number: 4,704,209

[45] Date of Patent: Nov. 3, 1987

[54] SULPHONATE-CONTAINING TERPOLYMERS AS FLOCCULANTS FOR SUSPENDED SOLIDS

[75] Inventors: Paul F. Richardson, Glen Ellyn; Lawrence J. Connelly, Oak Lawn; Dodd W. Fong, Naperville; Ralph W. Kaesler, Barrington, all of Ill.

[73] Assignee: Nalco Chemical Company, Naperville, Ill.

[21] Appl. No.: 889,729

[22] Filed: Jul. 28, 1986

[51] Int. Cl.⁴ .................................................. C02F 1/56
[52] U.S. Cl. ........................................ 210/734; 209/5; 210/907
[58] Field of Search .................... 209/5; 210/725, 727, 210/728, 733, 734, 907; 526/287, 288

[56] References Cited

U.S. PATENT DOCUMENTS

| | | | |
|---|---|---|---|
| 3,692,673 | 9/1972 | Hoke | 210/728 |
| 4,147,681 | 4/1979 | Lim et al. | 210/734 |
| 4,342,653 | 8/1982 | Halverson | 210/734 |
| 4,545,902 | 10/1985 | Connelly et al. | 210/734 |
| 4,555,346 | 11/1985 | Rosen et al. | 210/5 |
| 4,569,768 | 2/1986 | McKinley | 210/734 |
| 4,599,390 | 7/1986 | Fan et al. | 210/734 |

OTHER PUBLICATIONS

The Condensed Chemical Dictionary, 8th Edition, von Nostrand Reinhold Company, 1971, p. 848.

Primary Examiner—Peter Hruskoci
Attorney, Agent, or Firm—John G. Premo; Anthony L. Cupoli; Donald G. Epple

[57] ABSTRACT

A process of flocculating suspended solids which comprises treating such suspension with an effective amount of a flocculant comprising a water-soluble terpolymer which contains sulfonate groups and has an RSV of at least 15.

10 Claims, 5 Drawing Figures

SULPHONATE-CONTAINING TERPOLYMERS AS FLOCCULANTS FOR SUSPENDED SOLIDS

INTRODUCTION

Flocculants are reagents which are added to suspensions of solids to cause the solids to floc and settle. A highly effective type of flocculant are the water-soluble polymeric type since this type can be prepared in numerous variations. Typically, polymeric flocculants are of three types, nonionic, cationic, and anionic. The particular type of flocculant to be used in a given application will generally depend upon the nature of the surface of the suspended solids, as well as the aqueous environment.

A particularly useful polymeric flocculant for treating aqueous slurries of mineral suspensions such as coal slurries or phosphate slimes are copolymers of acrylamide and AMPS[1]. The use of these polymers for such applications is described in U.S. Pat. No. 4,342,653.

[1]AMPS is 2-acrylamido-2methylpropanesulfonic acid and is a registered trademark of Lubrizol Corporation.

The present invention relates to terpolymers containing water-soluble polymers containing sulfonate groups which show improved activity over those polymers described in U.S. Pat. No. 4,342,653.

THE INVENTION

In accordance with the present invention there is provided a process for flocculating suspended solids. The instant process is particularly effective on aqueous solid suspensions wherein the solids are phosphates slimes, tar sands, saponites, humate wastes, coal refuse, mineral tailings such as copper tailings, the residue from leach liquors such as are generated in uranium or copper leaching and the like.

Specifically, the invention comprises a process for flocculating suspended solids which comprises adding to an aqueous suspension of solids an effective amount of a flocculant which comprises a water-soluble terpolymer having a Reduced Specific Viscosity (RSV)[1] of at least 15 and preferably at least 24. It is composed of the random repeating units:

[1]RSV is measured on a 0.045% polymer solution in 1-N sodium nitrate pH8.

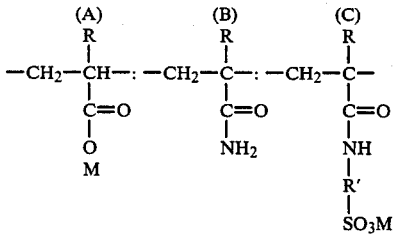

where:
R is methyl or hydrogen, preferably hydrogen,
M is hydrogen, alkali metal, ammonia, or amine,
R' is —$(CH_2)_n$ and,
n is a whole number from 1–5, and preferably is 1 or 2, with the ratio of A:B:C being:

|  | A: | B: | C |
|---|---|---|---|
| General: | 3–50 | 50–95 | 3–40 |
| Preferred: | 4–35 | 55–95 | 4–15 |

To flocculate the solids in these aqueous suspensions, an effective amount of the specified anionic flocculant is added to the suspension. This addition is generally made in a manner which provides uniform distribution of the flocculant throughout the suspension so as to obtain maximum flocculation of solids. Mixing may be an added operation or may be inherent in processing, such as addition to a moving stream of suspension en route to a settling tank. An effective amount of flocculant is that amount which produces the desired level of flocculation and will vary widely depending upon many factors such as the nature of the suspension, the specific flocculant employed, the extent of flocculation or settling rate desired and the like. Generally, the amount of flocculant will follow conventional dosages except that the present invention allows for reductions in such dosages in appropriate instances. Usually a dosage of about 0.05 to 5.0 milligrams of flocculant per liter of suspension will be effective.

It is additionally recognized that the unhindered settling of the flocs so formed only occurs in the uppermost portion of a thickener bed or settling tank. In the lower portion of the bed or tank, the weight of the flocculated material settling above acts to compact the settled flocs below so as to produce an underflow of flocculated material with a solids content considerably higher than the original flocculating suspension. When the underflow of such a bed or tank is transferred to a landfill for permanent disposal, the weight of the overburden causes additional compaction of the flocculated material. The polymers used in the instant process have surprisingly been found, when used in the flocculation process of the instant invention, to exhibit a unique ability to promote improved compaction of the flocculated solids as compared with other anionic flocculants such as acrylamide-acrylic acid copolymers.

In certain aqueous solid suspensions there is present in the aqueous system a high content of multivalent cations. These multivalent cations have been found to hinder the effectiveness of many prior art flocculants, especially anionic in nature. The process of this invention has proven exceptionally effective against these multivalent cation containing aqueous suspension of solids. Suspensions containing $Ca^{+2}$, $Al^{+3}$, $Fe^{+3}$, $Fe^{+2}$, $Mg^{+2}$, and the like have been found to be effectively treated. Examples of such suspensions include phosphate slimes, saponites found in kimberlite clay slimes and humate wastes treated with alum or ferrous sulfate.

PREPARATION OF THE POLYMERS

Figure 1:
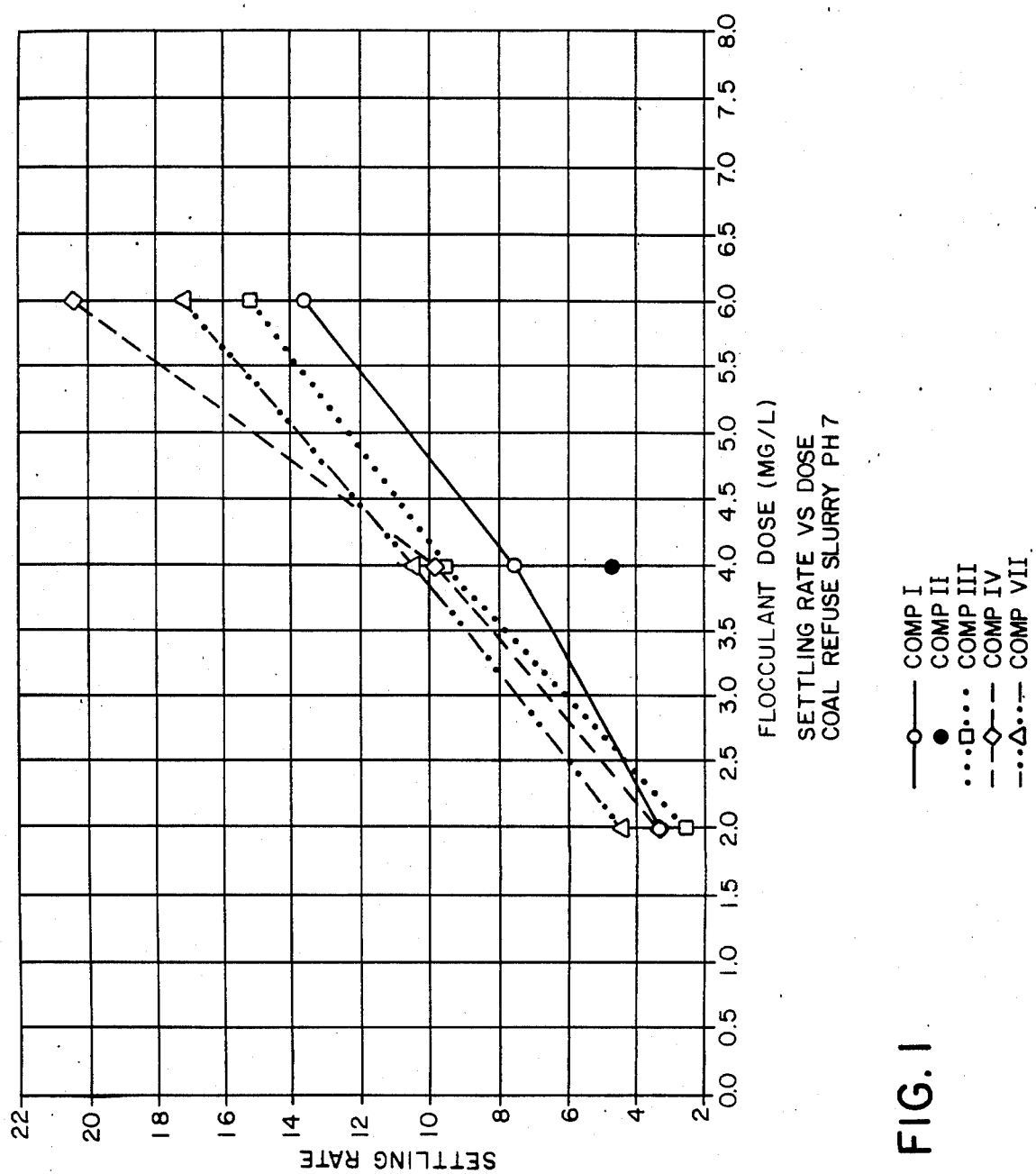
FIGS. 1–5 show test results produced by the present invention.
Figure 2:
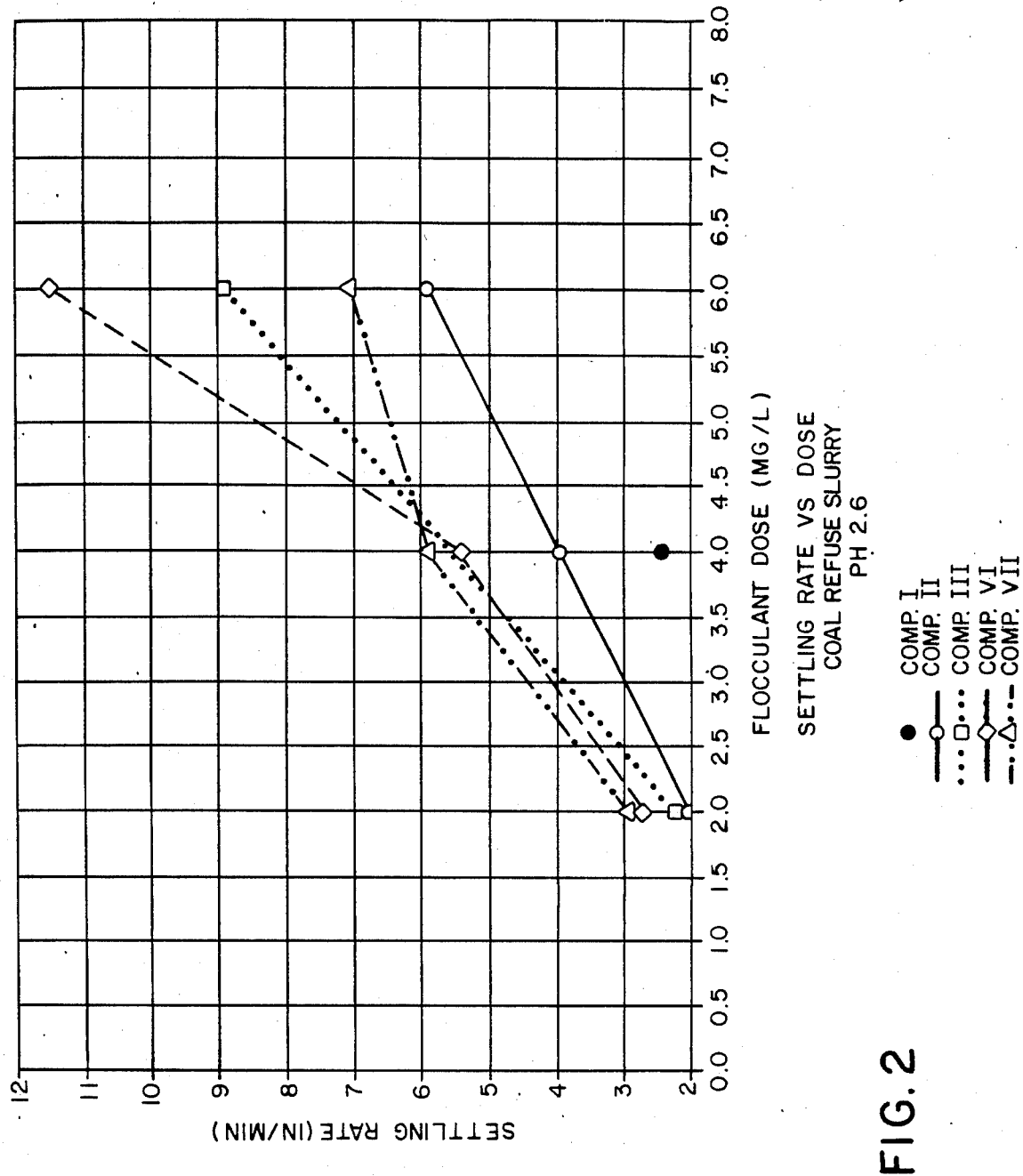
Figure 3:
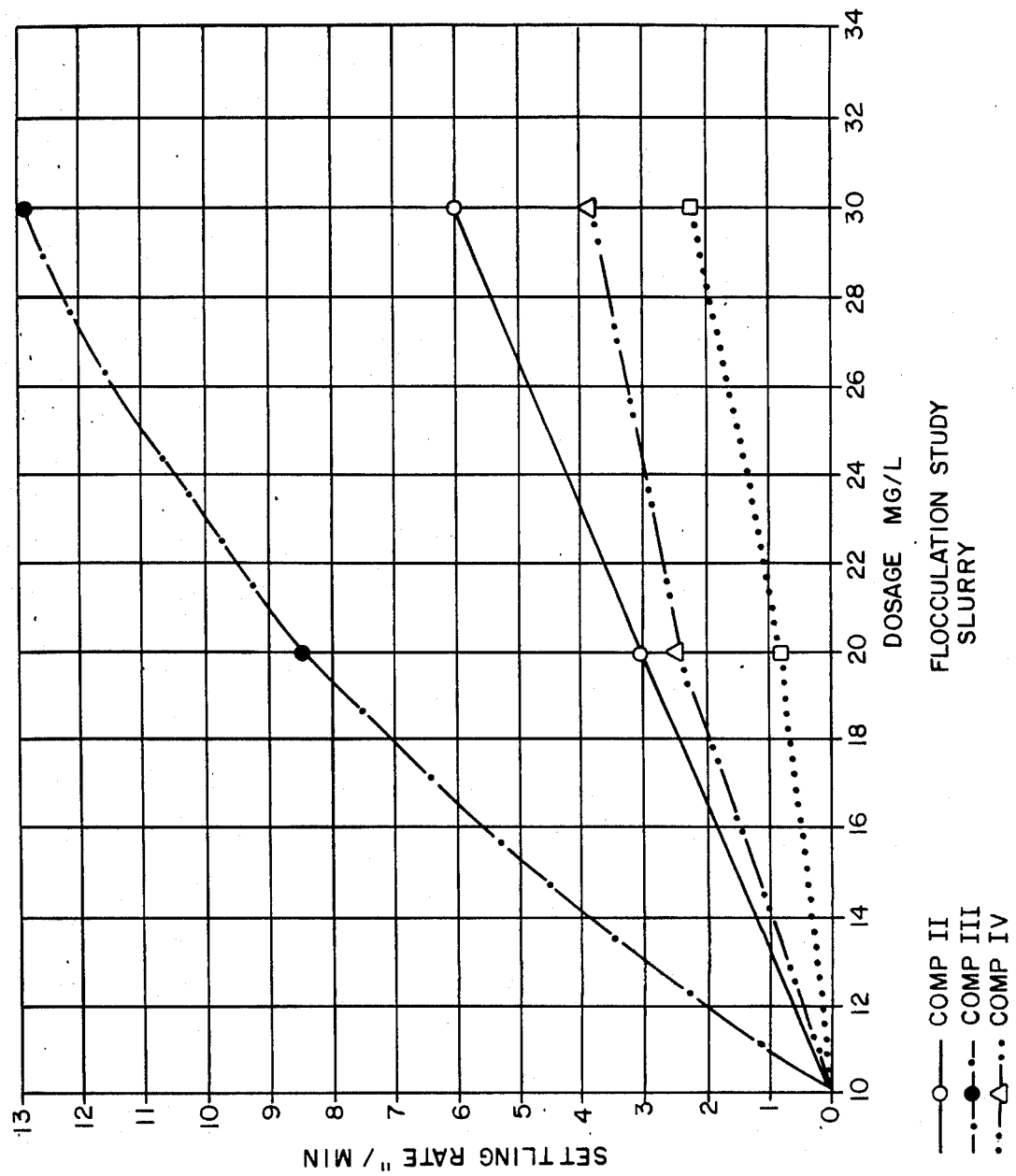
Figure 4:
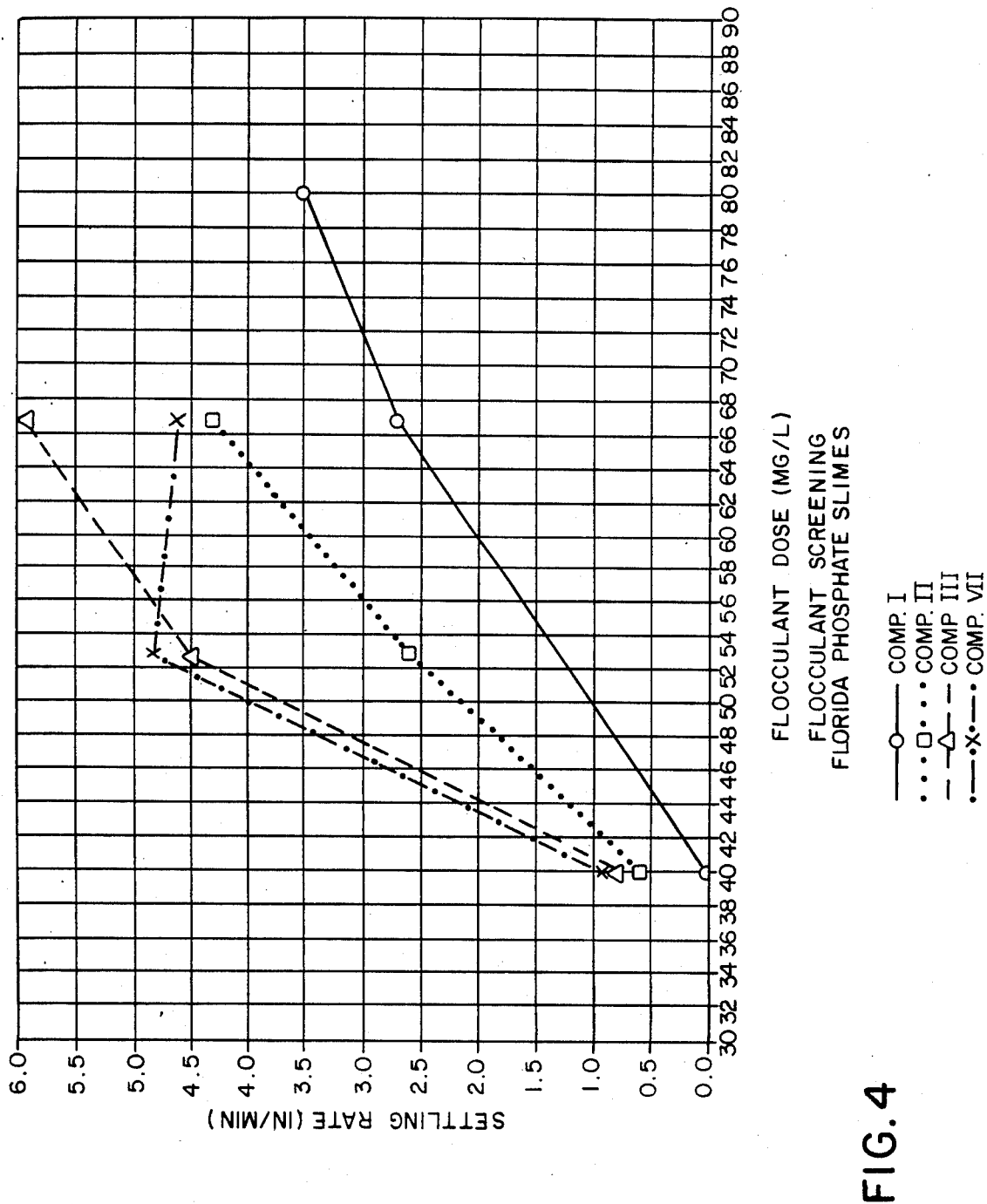
Figure 5:
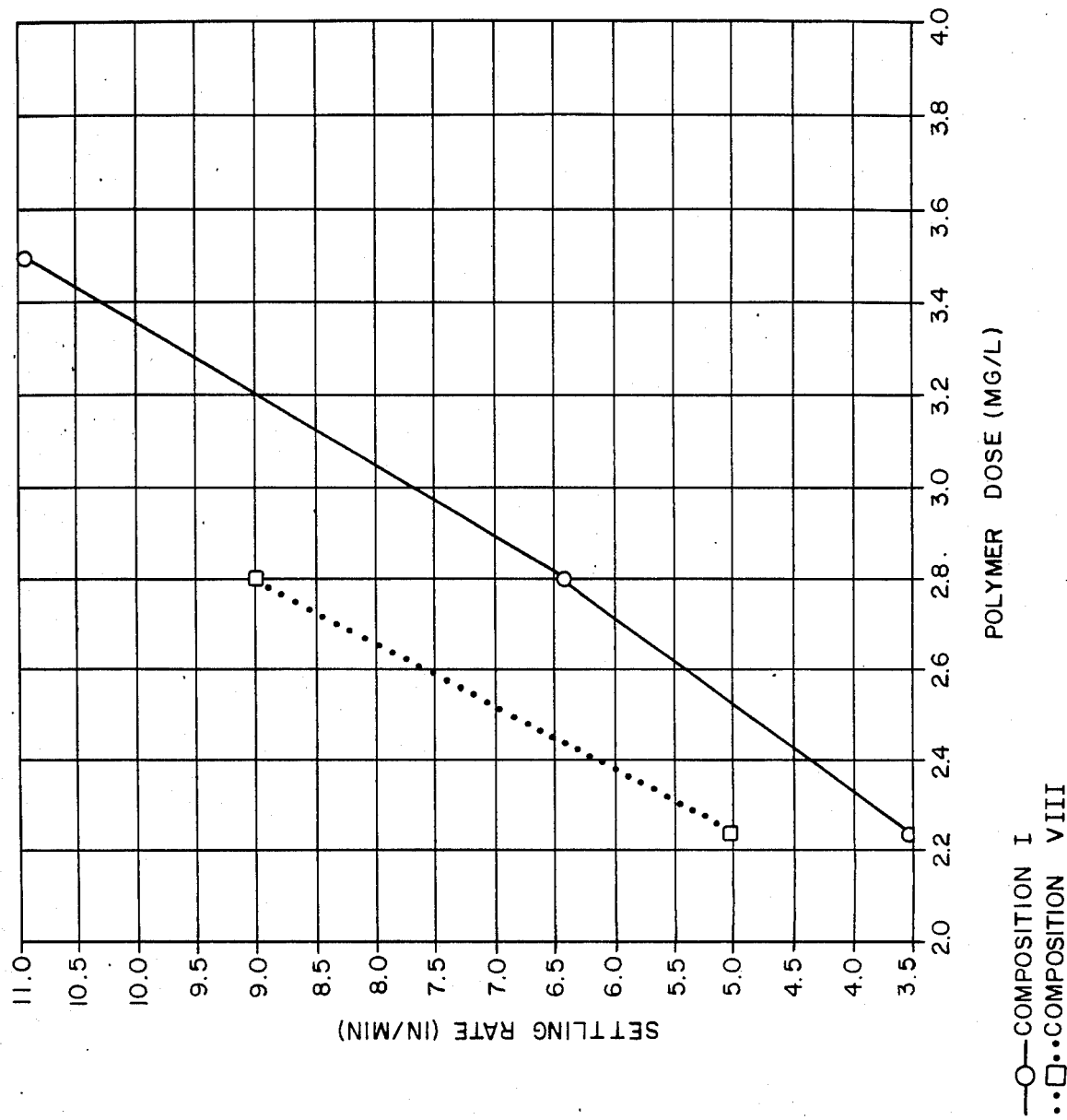

The polymers may be prepared conveniently by reacting an acrylamide homopolymer or an acrylamide-acrylic acid copolymer with an appropriate amino alkane sulphonic acid under conditions whereby transamidation of at least a portion of the acrylamide groups is achieved. Such reactions are achieved at temperatures of at least 100° C. The polymers and the amino sulphonate reactant are charged as water-in-oil emulsion to a pressure reactor equipped with pressure and temperature measuring devices as well as an agitator. Temperatures between 100°–150° C. are acceptable. The reaction may be conducted over a period ranging between 20 minutes to those in excess of 4 hours.

Evaluation of the Invention

New sulfonate containing polymers prepared by modifying sodium acrylate and acrylamide copolymers with taurine as shown hereafter give improved performance as mineral processing flocculants. The characterization of these taurine modified polymers tested is presented in Table I. These polymers have been tested on a coal refuse slurry at pH 7, a coal refuse slurry at pH 2.6, an alumino silicate slurry, on phosphate slimes, and on a sand and gravel refuse slurry.

In coal refuse, Composition I, represents a common polymer which is usually the flocculant used commercially in such applications. In cases where the slurry pH is less than 5, Composition II is the flocculant of choice. The results of this test work are shown in FIGS. I and II. At pH 7, Composition III, VI and VII were more active than Composition I, while at pH 2.6, the three experimental polymers were significantly more active than Composition II.

On an alumino silicate slurry, Composition II is the flocculant of choice. As shown in FIG. III, Composition III was significantly more active than Composition II. Compositions IV and V showed good activity, but not quite as good as Composition II.

TABLE I

|  | Mol % Acrylate | Mol % AcAm | Mol % Sulfonate | RSV |
|---|---|---|---|---|
| Comp I | 35 | 65 |  | 33 |
| Comp II |  | 89 | 11* | 22 |
| Comp III | 31.6 | 58.6 | 9.8 | 49 |
| Comp IV | 14.8 | 74.7 | 10.5 | 24 |
| Comp V | 4.4 | 91.5 | 4.1 | 31 |
| Comp VI | 18.9 | 71.6 | 9.5 | 50 |
| Comp VII | 20.4 | 73.8 | 5.8 | 47 |
| Comp VIII | 32.1 | 58.8 | 9.1 | 51 |

*AMPS

For thickening phosphate slimes, either Composition I or Composition II is the best flocculant. The use of Composition II for this application is suggested by U.S. Pat. No. 4,342,653. Two of the experimental flocculants were screened for activity versus Composition II and Composition I. The results are shown in FIG. IV. While Composition II is clearly superior in activity to Composition I, two of the experimental flocculants show even better activity than Composition II.

For thickening refuse from a sand and gravel plant, Composition I is the best flocculant. Composition VIII was tested against Composition I. The results, shown in FIG. V, demonstrate the superior activity of Composition VIII.

Having thus described our invention, it is claimed as follows:

1. A process of flocculating suspended solids in an aqueous suspension selected from the group consisting of a coal refuse slurry, phosphate slimes, and refuse from a sand and gravel plant which comprises treating said suspension with an effective amount of a flocculant comprising a water-soluble terpolymer having a reduced specific viscosity of at least 24 and being composed of the random repeating units:

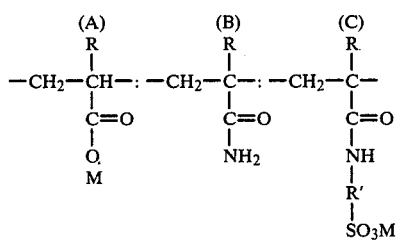

where:
R is methyl or hydrogen,
M is hydrogen, alkali meta, ammonia, or amine,
R' is $-(CH_2)_n$ and,
n is 1 or 2,
with the mol ratio of A:B:C being: A(3–50):B(55–95):C-(4–15), flocculating the suspended solids and then separating the flocculated solids from the suspension.

2. The process of claim 1 wherein the ratio of A:B:C is: A(4–35):B(55–95):C(4–15).
3. The process of claim 1 wherein n=1.
4. The process of claim 1 wherein n=2.
5. The process of claim 1 wherein the suspension is a coal refuse slurry.
6. The process of claim 5 wherein n=2.
7. The process of claim 1 wherein the suspension is phosphate slimes.
8. The process of claim 7 wherein n=2.
9. The process of claim 1 wherein the suspension is refuse from a sand and gravel plant.
10. The process of claim 9 wherein n=2.

* * * * *